US008794506B2

(12) United States Patent
Hvidtfeldt

(10) Patent No.: US 8,794,506 B2
(45) Date of Patent: Aug. 5, 2014

(54) SYSTEM FOR AUTOMATIC IMAGE ASSOCIATION

(75) Inventor: Henrik Hvidtfeldt, Hellerup (DK)

(73) Assignee: Digitaqq, Hellerup (DK)

( * ) Notice: Subject to any disclaimer, the term of this patent is extended or adjusted under 35 U.S.C. 154(b) by 400 days.

(21) Appl. No.: 12/709,490

(22) Filed: Feb. 21, 2010

(65) Prior Publication Data

US 2010/0213251 A1   Aug. 26, 2010

Related U.S. Application Data

(60) Provisional application No. 61/154,436, filed on Feb. 23, 2009.

(51) Int. Cl.
*G06F 17/00* (2006.01)
*G06K 7/10* (2006.01)
*H04N 1/00* (2006.01)
*H04N 1/21* (2006.01)

(52) U.S. Cl.
CPC ......... *H04N 1/2166* (2013.01); *H04N 1/00363* (2013.01); *H04N 1/0036* (2013.01); *H04N 1/00137* (2013.01); *H04N 1/00374* (2013.01); *H04N 1/00156* (2013.01); *H04N 1/00132* (2013.01)
USPC ..................................... 235/375; 235/462.01

(58) Field of Classification Search
CPC .......... G06K 7/10732; G06K 7/10712; G06K 7/10722; G06K 2207/1012; G06K 7/10693; G06K 7/10792; G06K 7/10861; G06K 7/1417; G06K 19/06028; G06K 7/1095; G06K 2019/06253; G06K 9/228; G06Q 20/3276; G06Q 20/3274; G06Q 30/016; G07F 17/30879; H04N 1/00241; H04N 1/0044; H04N 1/03; H04N 2201/0081; H04N 2201/0084; H04N 2201/0096; H04N 2201/043; H04N 2201/045
USPC ............ 235/383, 379, 375, 462.01; 358/1.18; 271/297; 355/40; 707/3; 348/207.1; 252/3, 12
See application file for complete search history.

(56) References Cited

U.S. PATENT DOCUMENTS

| 4,228,996 A * | 10/1980 | Wilcox, Jr. ................... 271/297 |
| 6,661,433 B1 * | 12/2003 | Lee ............................... 235/383 |
| 6,831,729 B1 * | 12/2004 | Davies ............................ 352/3 |
| 7,016,868 B1 | 3/2006 | McIntyre et al. |

(Continued)

FOREIGN PATENT DOCUMENTS

| JP | 2002077474 | 3/2002 |
| JP | 2004295198 | 10/2004 |

OTHER PUBLICATIONS

PCT preliminary report on patentability—PCT/IB2010/050774—dated Aug. 23, 2011.

*Primary Examiner* — Thien T Mai
(74) *Attorney, Agent, or Firm* — Tue Nguyen

(57) ABSTRACT

Methods and systems for improving a photography business are disclosed, comprising, in an embodiment, taking a photograph of a coded component together with a series of photographs for the client. The coded component comprises human-readable information and is provided to the client for access to the photographs. The coded component also comprises machine-readable information, enabling a server to sort the photographs to the corresponding jobs without operator intervention. The coded component can also comprise a fillable option field to identify that the photographs associated with the coded component are to be specially treated according to a desired selection.

20 Claims, 18 Drawing Sheets

(56) References Cited

U.S. PATENT DOCUMENTS

| | | | |
|---|---|---|---|
| 7,377,423 B2* | 5/2008 | Demmeler et al. | 235/379 |
| 2002/0012134 A1* | 1/2002 | Calaway | 358/1.18 |
| 2003/0189721 A1 | 10/2003 | Freelund et al. | |
| 2004/0066455 A1* | 4/2004 | Holmes | 348/207.1 |
| 2004/0267639 A1 | 12/2004 | McIntyre et al. | |
| 2005/0151943 A1* | 7/2005 | Iida | 355/40 |
| 2006/0013576 A1 | 1/2006 | Sauder | |
| 2007/0014565 A1 | 1/2007 | Hanuska et al. | |
| 2009/0171915 A1* | 7/2009 | Rothschild | 707/3 |

* cited by examiner

SYSTEM FOR AUTOMATIC IMAGE ASSOCIATION

The present invention relates to photography or photographic services, and particularly to improved automation of image storage for a photography business. The present application claims priority from the provisional patent application Ser. No. 61/154,436, filed on Feb. 23, 2009, entitled "System for automatic image association", hereby incorporated by reference.

BACKGROUND OF THE INVENTION

Image management has long been an issue for professional photographers and other providers of photographic services. Digital image capture has compounded the problem due to the increasing quantity of captured and stored images. Clients demand secure and private access to their images particularly when there is computer or on-line access available. Faced with hectic schedules, multiple cameras, and large numbers of images, photographers have sought solutions to the image management issue.

Many photographers have solved this problem manually by taking note of a picture counter for each job or by using separate memory storage, film or folders for each job. Each of these solutions implies a manual process requirement and does not support automation.

SUMMARY

The present invention includes methods and systems for improving the photography business, managing the business aspect to allow the photographer to concentrate on the photographs. Further, the present invention can provide processes to automate the photography business, reducing the time involved in the business service aspect of the business and providing enhanced privacy for clients by preventing unauthorized access to stored photographs. This automated image association may be used by one or multiple photographers and may be implemented on one or more cameras at an event. Multiple methods of implementation are described including an automated method for capturing and labeling a series of photographs as well as other methods for categorizing images. This invention may have other photographic or image storage applications.

In an embodiment, the present process comprises taking a photograph of a coded component together with a series of photographs for each client. The coded component or the information relating to the coded component can be transferred to the client for access to the photographs while the photograph containing the coded component serves as a delimiter for separating photographs of different jobs. The process can follow any order, for example, taking the photographs relating to the job may be performed before or after capturing the photograph of the coded component, or capturing the photograph of the coded component may be performed before or after the client receives the coded component.

In an embodiment, the present invention discloses a process and a data processing system, e.g., a server, to automate the photography business using a coded component. For example, the coded component can comprise an image that is machine readable and recognizable, which enables the server to identify the photographs containing the coded components among the plurality of photographs. The coded components can serve to identify different jobs or different clients, and the remaining photographs are automatically sorted to the corresponding jobs by their association with the coded components. Additionally, the coded component can comprise an option field identifying a desired treatment of the photographs. Upon decoding the information from the option field, the server can automatically treat the photographs associated with this coded component according to the desired instructions. The process can be automated with minimum operator interaction, including client review and selection of photographs, together with billing and payment. Further, a coded component may represent the purchase item option such as instructions for treatment of photographs. Multiple coded components may be presented in a single job identification.

In an embodiment, the coded component also comprises human readable information such as a job name and a password to allow the client to access the photographs. Upon identifying the coded components, sorting and performing optional treatment on the selected photographs, the server can automatically create different accounts with different access levels to distributedly store the photographs associated with the coded components. Using the coded component, which was, for example, handed by the photographer at the photo shoot session, a client can then log in the account, preferably secured by a password, to access the photographs.

DETAILED DESCRIPTION OF THE INVENTION

The present invention relates to an automated system for image management which can permit a photographer to reduce the time spent on image management and storage. In an embodiment, the present invention employs a picture (or a photograph) with a unique graphic pattern (called a coded component) inserted before, after and/or during a photography job to create a delimiter between jobs. In an aspect, the coded component is machine readable and/or recognizable, or coded from unique identification string that will identify the job, and can be machine decoded from the sequence of pictures to group the pictures according to the coded components.

In an embodiment, the present invention discloses a photography business automation process comprising taking a photograph of a coded component, such as a card or other imageable media, as a job marker for a series of photographs for the client. The coded component can be provided to the client for access to the photographs after the photography session.

Figure 1:
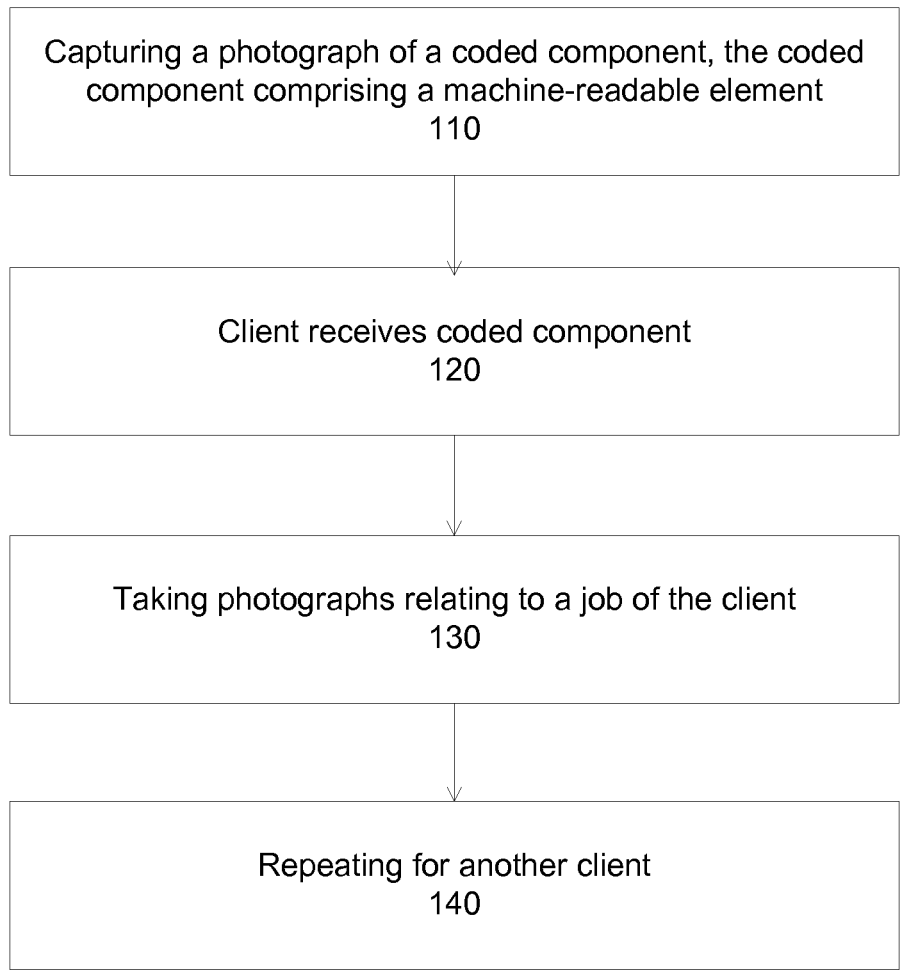
FIG. 1 illustrates an exemplary embodiment of the present invention taking a series of photographs including a photograph of a coded component serving as a delimiter between jobs.

FIG. 1 illustrates an exemplary embodiment of the present process, comprising taking a photograph of a coded component which is handed to a client prior to taking a series of photographs for the client. The coded component for the next client can denote the end of the previous series. In this case, unique client coded components provide the indication of a start or end of a linked series of photographs or images. For example, the photographer captures an image of the coded component linked with Client A. The photographer then performs the photo shoot, capturing photographs that will be associated with Client A. The photographer then proceeds to the next job, for example, that of Client B, and repeats the sequence. The photograph of the coded component linked with Client B then ends the series for Client A, and starts the series for Client B. The jobs in this case are not time limited; they may take place within a day or over an extended period of time.

Block 110 illustrates the photographer capturing an image of the coded component with a camera. The image includes the coded component, and may include other subjects, such as the client. The coded component is preferably a business card with appropriate information, but other printed or imageable media can also be used, which then can act as a job marker for the photography session. The coded component may also be displayed on an electronic display, such as a monitor or a display screen of a personal digital assistant [PDA], smart phone, laptop computer or any other imageable media. To facilitate automation, the coded component comprises a machine-readable element to enable a data processing system, such as a server, to automatically process the coded component embedded in the photograph. The machine-readable element preferably includes some patterns that can be recognized easily by a computer, such as 1D barcode or 2D data matrix barcode. Alternatively, the machine-readable element can comprise any pattern that can be recognized by machine vision and/or image recognition algorithm(s). The coded component can include optional treatments for the job, such as special treatment of the photographs, or special treatments for account handling or billing. In Block 120, the coded component is then provided to the client, for example, to enable the client to access the images. The coded component can also include human-readable information, such as a job name or a password for secured access to the photographs. Alternatively, instead of the coded component itself, information relating to the coded component can be given to the client, directly or indirectly. For example, the coded component or the information can be handed directly to the client in a face-to-face session. Alternatively, the coded component or the information can be transferred to the client, for example, in an email, or text or voice message. Or the coded component or the information can be transferred indirectly to the client, for example, by posting it in a website where the client can retrieve it at their convenience. In addition, the information can be given during the photo session, or anytime earlier or later, for example, a few days later. In an embodiment, there is no information or coded component given to the client. The client can access the photographs by personally visiting the store (e.g., physical store or website representation) where the information or storage server is kept. In Block 130, the photographer then performs the photo shoot, capturing a series of images over a period of time. Preferably the photographs are taken until the memory card is full (for a digital camera), or the roll of film is finished (for a film camera), or the job is complete (for example, for a case of wire or wireless transfer of photographs to a computer). The photographer can swap a new memory card (or a new roll of film), and keep taking pictures until the job is done. The process can be repeated with a new client and a new job session (Block 140). In the case where the coded component is available in electronic form, which is displayed in a display screen such as a PDA, smart phone, camera or other means, a link to the coded component may be transferred to the client, to a server, a webserver or a photography store via email, text message or other notification methods. Additionally, multiple photographs containing multiple separate coded components may be captured in some instances to further identify the photographs or the job request. Also, multiple coded components can be presented and captured in a single photograph. Each coded component can provide different information. For example, a first coded component can offer an affiliation of the client, such as a school, a company or a group. A second coded component can indicate a special treatment, such as using certain logos, frame, lightning or photograph surface treatment.

Figure 2A:
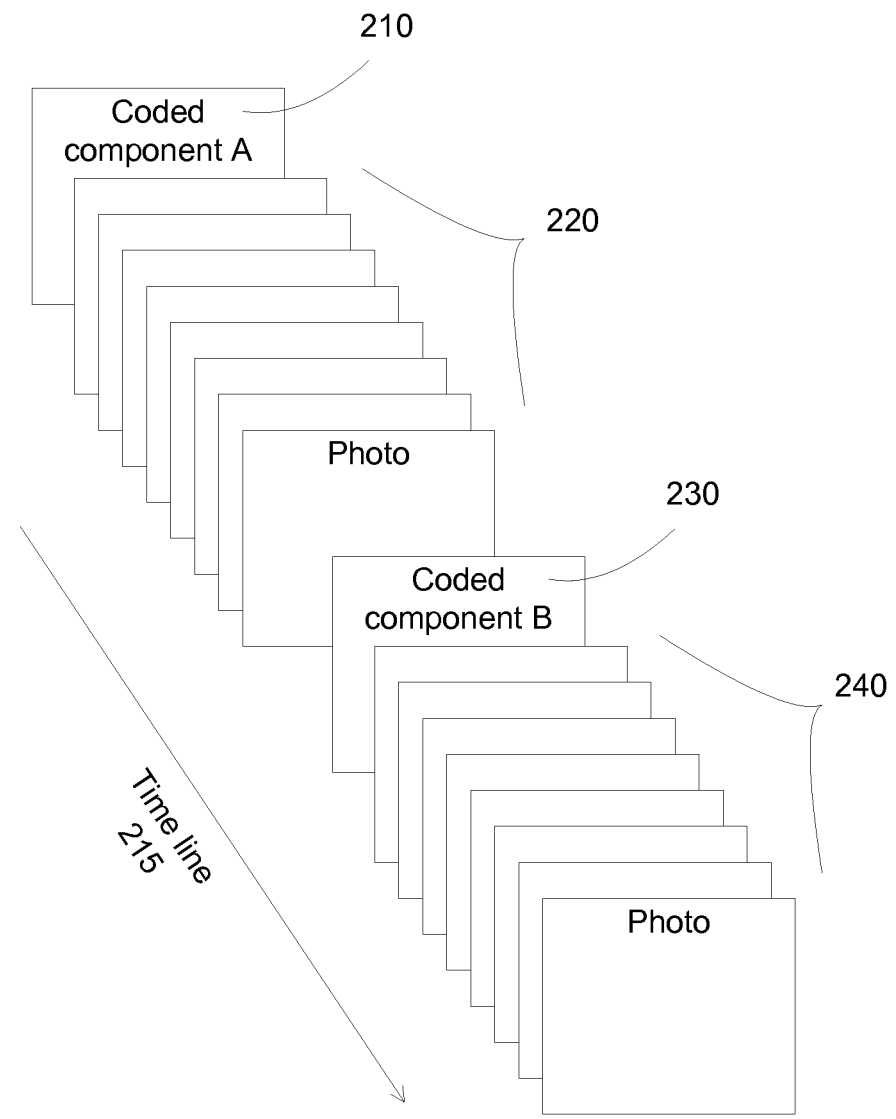
FIGS. 2A and 2B illustrate various exemplary embodiments of capturing a series of photographs including photographs of a coded component serving as a delimiter between jobs.

FIG. 2A illustrates an exemplary sequence of the images following the process described in FIG. 1 as captured by the photographer. A coded component 210 is captured first, followed by a series of photos 220 for the job marked by the coded component 210. The series of photos 220 are probably taken according to time, where the photos near the coded component 210 are taken before the photos at the end of the series. A new coded component 230 signifies a new job (for the same client or for a different client) with the series of photos 240 linked to the new coded component 230. Other jobs can be added later.

Figure 2B:
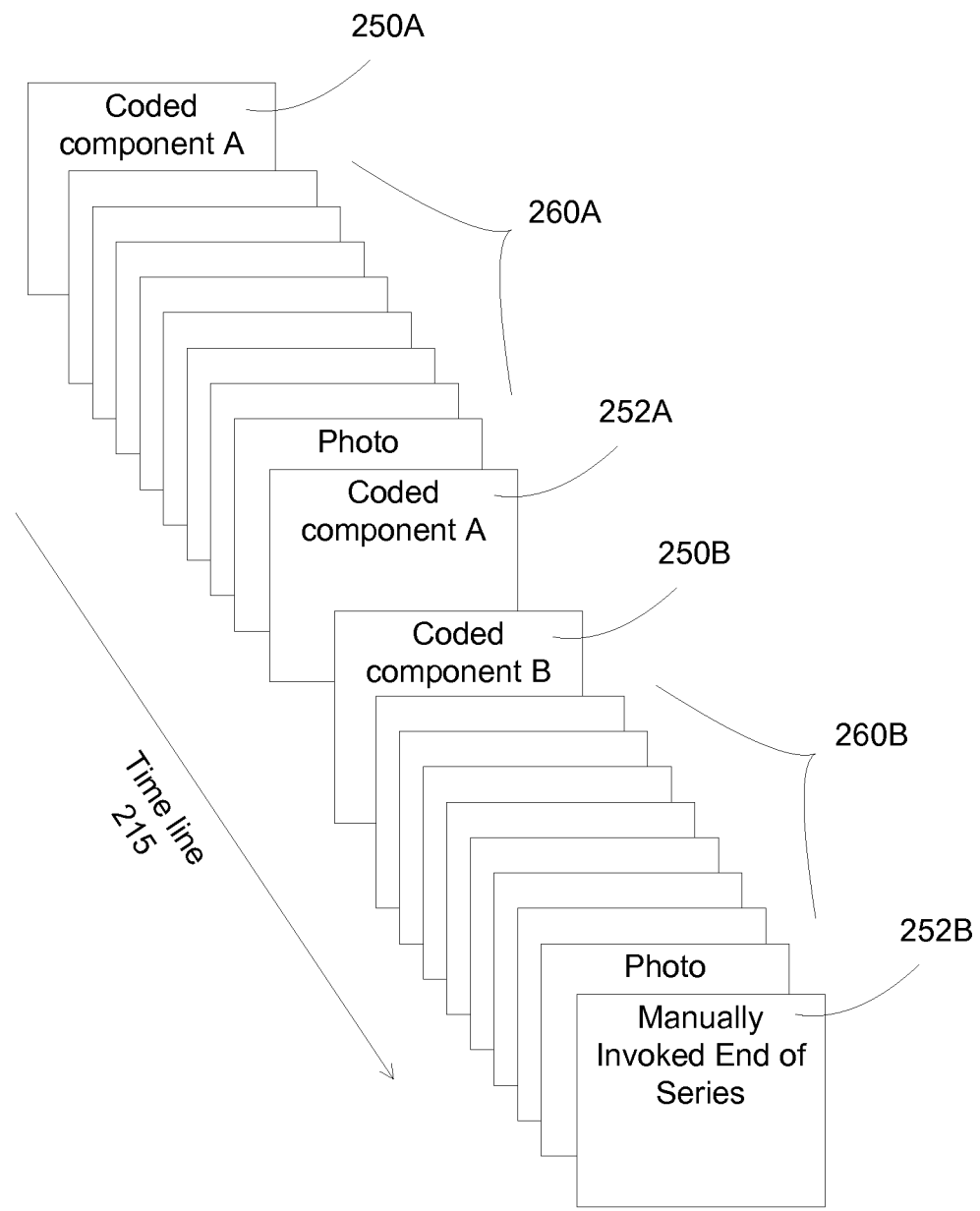

This figure illustrates an exemplary configuration where the coded component is a beginning tag and positioned at the start of a series of photos. In other words, the photos following a coded component are part of the job identified by the coded component until encountering a new coded component. In an aspect, another coded component (or the same coded component) can be added at the end of the job to identify the end of the series. FIG. 2B illustrates an exemplary variation of the above configuration where end coded components, which can be the same or different than beginning coded components, are added at the end of a photo series. For example, as shown, beginning coded components 250A/250B and end coded components 252A/252B group the series of photos 260A/260B to identify that the series of photos 260A/260B belongs to the job of the coded components 250A/250B and 252A/252B respectively. The coded components 250A/250B and 252A/252B can have the same or different identification. For example, 252B shows a manually invoked end of series.

In an aspect, there could be more photos in one job than one memory card can store. The extra memory cards can start with the same coded component for the job, a continuation coded component, or no coded component at all. Job identification of the photos in the extra memory cards can be based on the coded component (if there is the same coded component or a continuation coded component), based on the continuation of time stamped on the photos, or the continuation of photo numbering sequence. In addition, the job identification can be based on the numbering of the memory cards, for example, memory card #2 is a continuation of memory card #1. Alternatively, multiple coded components can be used and linked to a same job. In this case, a new memory card can employ a new coded component, and the new coded component can be associated with the previous coded component to identify the same job.

Figure 3A:
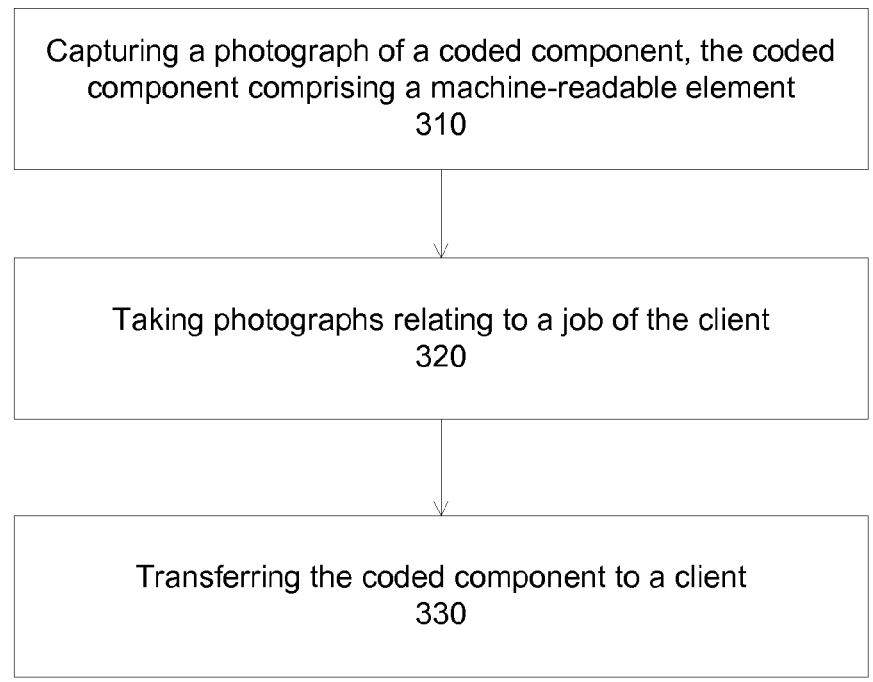
FIGS. 3A-3E illustrate multiple exemplary variations of the present process.

The present invention also discloses variations of the sequence illustrated in FIG. 1 of taking a picture of a coded component and taking pictures during a photography job. FIGS. 3A-3E illustrate different configurations of the same fundamental sequence, where the coded component can be captured before or after it is transferred to the client, or where the photographer takes photographs of the job before or after taking a photograph of the coded component. In FIG. 3A, the photographer captures the coded component in a picture (block 310), and then starts shooting the photography session (block 320) before transmitting the coded component to the client (block 330). One advantage of this configuration is that the photographer still has the coded component in his possession, thus he can use the same coded component in a picture when starting a new memory card. Or in the event of multiple cameras or photographers on the job, the photographer in possession of the coded component can pass the coded component so that all cameras have a picture of the coded component to identify the photo session. A photographer can ask for the coded component when swapping the memory card. At the end of the photo session, the coded component is handed to the client, for example, for access to the photographs. The coded component or link may be transferred to the client electronically, such as via email, text message or other indirect means such as posting on a webpage and permitting client access.

Figure 3B:
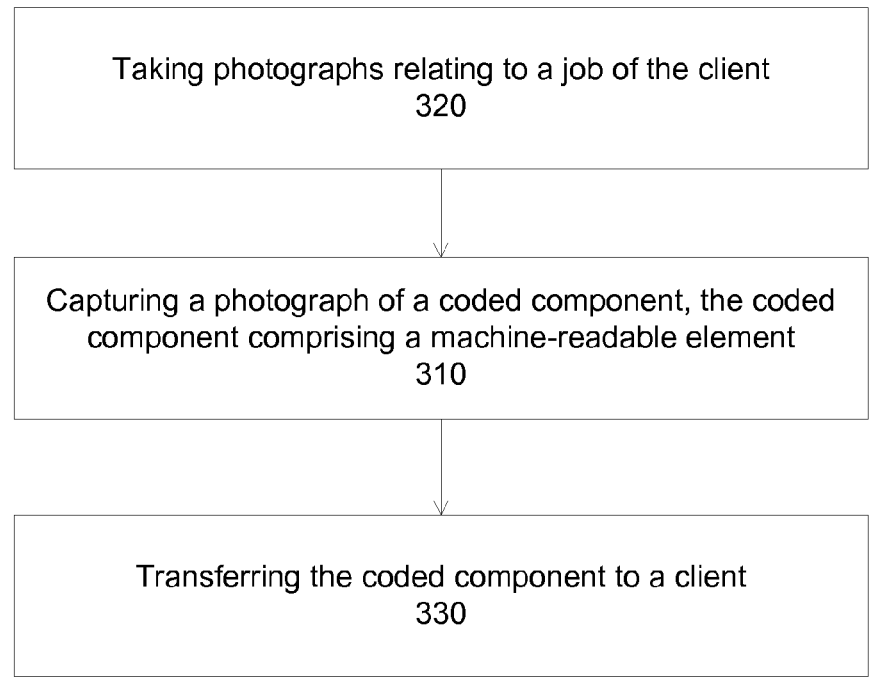

In FIG. 3B, the photographer starts shooting the photography session first (block 320). When the photography session completes, the photographer captures the coded component in a picture (block 310) before handing the coded component to the client (block 330). One advantage of this configuration is that the photographer can give the coded component to the client right after taking a photograph of it.

Figure 3C:
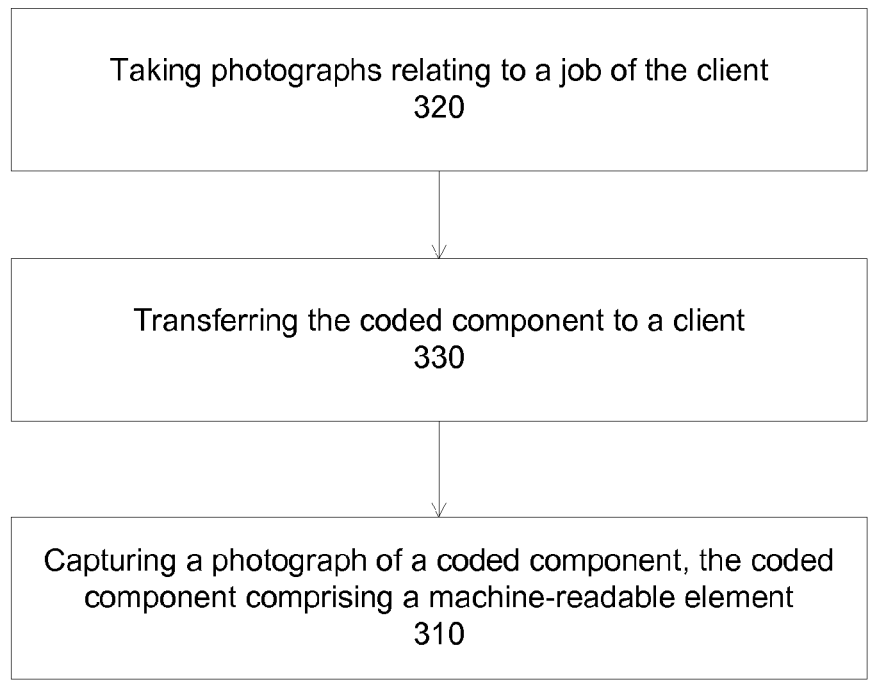

In FIG. 3C, the photographer starts shooting the photography session first (block 320). When the photography session completes, the photographer hands the coded component to the client (block 330) before taking a picture of the coded component (block 310). For example, the photographer can give the coded component to the client, and ask the client to hold the coded component and pose for the photographer, and then take a picture of the coded component together with the client. In these configurations, the coded component is an end tag, denoting the end of the job series.

Figure 3D:
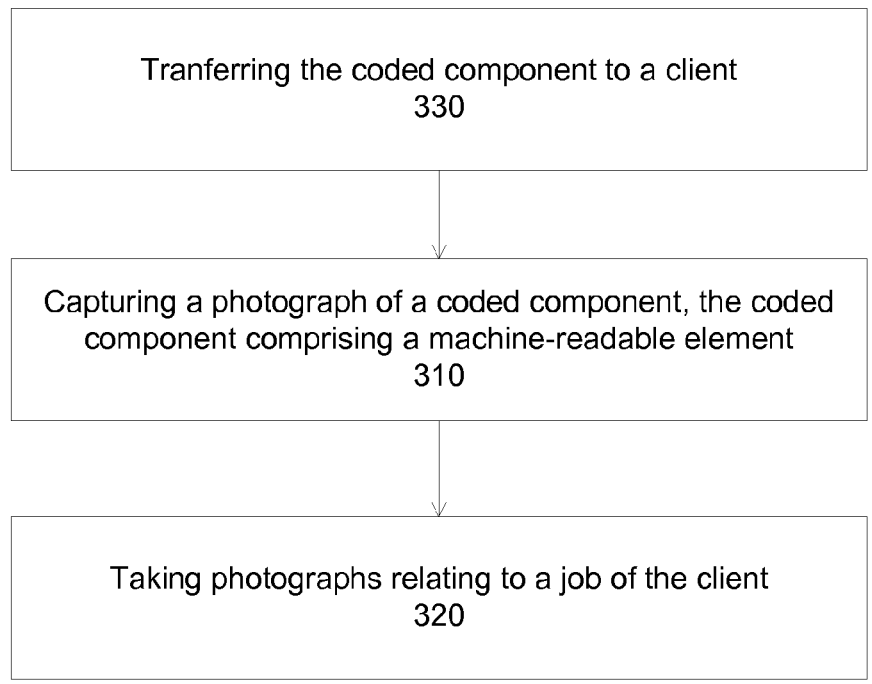
Figure 3E:
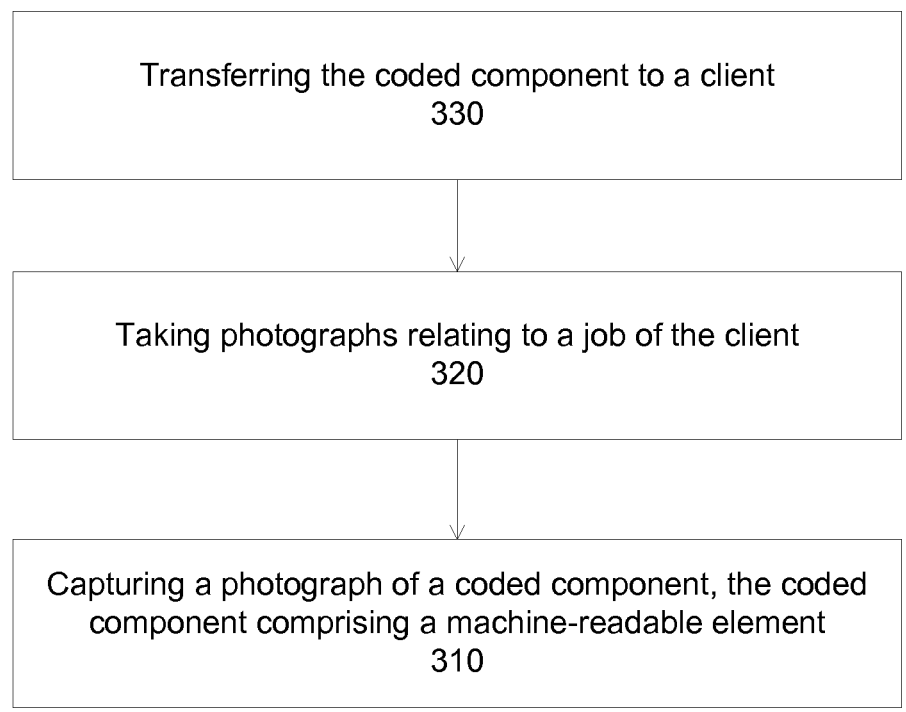

In FIG. 3D, the photographer transfers the coded component to the client first (block 330), then takes a picture of the coded component (block 310) before starts shooting the photography session (block 320). In FIG. 3E, the photographer also transfers the coded component to the client first (block 330), then starts shooting the photography session (block 320). When the photography session completes, the photographer then takes a picture of the coded component (block 310). The photographer may ask the client to pose with the coded component. The coded component can also be a duplicate coded component, similar to the one transferred to the client. Other variations are also possible, for example, processes without physically transferring the coded component to the client, or processes with giving information instead of handing the coded component to the client. The information can be given in person, for example, during the photo session or when the client visits the photographer or the photographer's store (e.g., physical store or web store). The information can be given by other means, such as by phone, email, fax, or website.

In these variation configurations, the coded component can serve as a begin tag or an end tag, depending on the photography sequence. Further, additional coded components can be included, for example, an end coded component is added to the configuration requiring a beginning coded component, e.g., the photographer may start and end the series of photographs with a start and an end coded component, respectively. The end component may be provided after each series where the photographer captures an image of the coded component to indicate the end of a series. The photographer may also manually invoke the end of the series at either the time of the photography sessions or at a time different from the photography session, such as right before the transfer of the photographs to the storage system. The end component may be invoked at the time end of the photo shoot, prior to starting the next photo shoot, or manually at a time different from the time of photography sessions. In each case, the end component provides a demarcation indicating the end of a series of photographs. Alternatively, an end of memory marker may be invoked at the end of a storage capacity, such as a roll of film or a memory card. Also, multiple coded components might be present for multiple cameras or for multiple photographers on the same job. Multiple coded components may also include job instructions, for example post processing instructions, requested photograph size or other instructions to relate post processing or purchase items to the photograph(s).

In an embodiment, the coded component is designed for auto sorting and/or client access. The auto sorting can be based on the sequence number of the pictures or the creation time and date or the capture time and date that can be extracted from the camera metadata (e.g., EXIF). The coded components can significantly reduce or eliminate operator post processing of the pictures taken at job sessions, such as sorting or assignment. The coded components can tag the pictures with a unique identification code at capture time for machine post processing identification, sorting or assigning. For example, the coded component can comprise machine readable or recognizable information or instruction, such as the job name, which photos belong to the job, etc., to allow automatic grouping of the photos according to the jobs, without operator intervention. The coded component can also comprise human readable or recognizable information, such as the job name and password, to allow the client to access the photographs, and to provide client privacy. For example, this feature may limit access to photographs belonging to a job name only to the client having the access code corresponding with the job name.

In an aspect, the present coded components can automate the photography business, with the post processing of pictures and jobs handled by machine, allowing the photographers to focus on the marketing and quality of photography. In addition, the present invention does not significantly change the work habit of the photographers, providing a suitable integration of the coded components into the work flow. For example, to practice an embodiment of the present invention, a photographer can take out a prepared business card with an embedded coded component, takes a picture of the card, and give it to the client before the start of shooting. Alternatively, the photographer may capture a photograph of the coded component from an alternate media display, such as a PDA. After downloading the pictures, the post processing is automatic, including sorting the photos, client access, and even client selection and billing. A number of business cards, each with a unique coded component, can be prepared ahead of time and thus the photographer is ready for any photography session.

Figure 4A:
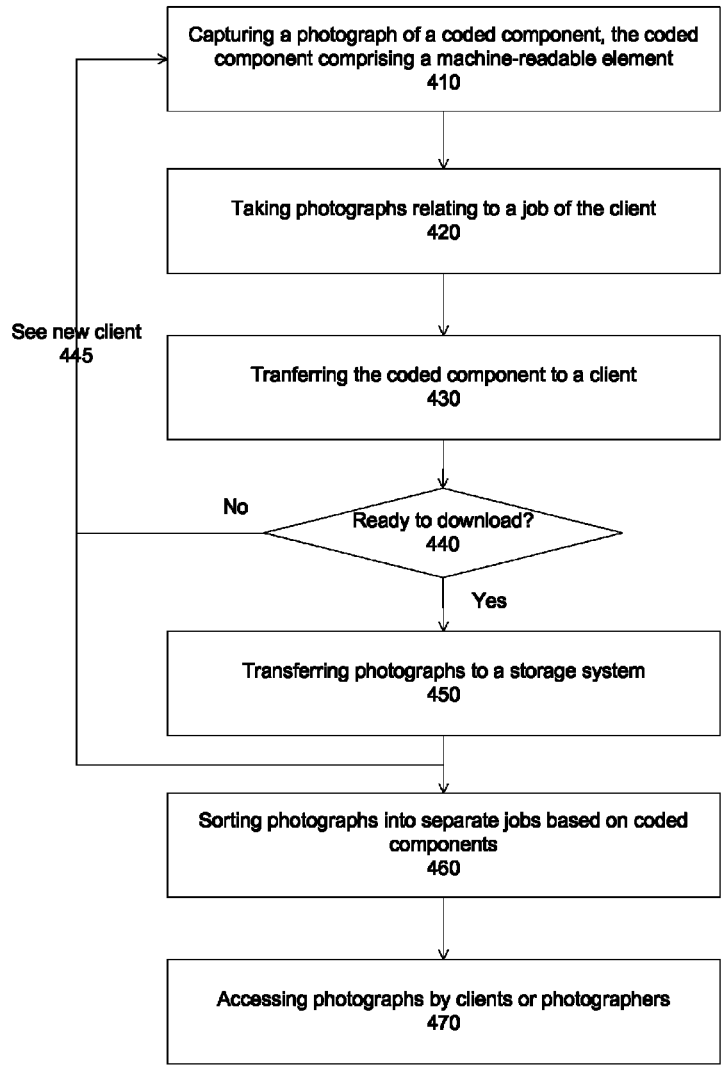
FIGS. 4A-4B describe various exemplary sequences of the present automation process as applied to a typical photography business.

In an embodiment, after completing a job session, the photographer can transfer the photos to a server. The present document describes an exemplary process for digital camera using memory card, but can be equally applicable to film camera using rolls of films, for example, with the aid of a scanner to convert analog pictures to digital pictures. FIG. 4A illustrates a flowchart showing an exemplary process of the present photography business. In Blocks 410, 420 and 430, the photographer captures the coded component image, performs the photo shoot, and transfers the coded component to the client, respectively. These operations can include other variations, for example, performed in any order as described in the previous sections. These operations can be repeated for subsequent jobs 445. In Block 440, the photos are ready to download, or the photographer decides to transfer the pictures, for example, to a storage system such as a server. The transfer can happen at the end of a job, at the end of multiple jobs, when the memory card is full, or any time that is convenient. The picture transfer can occur automatically, for example, by wire or wireless connection of the camera to the server. In Block 450, the photographer downloads the images captured during the photo shoot to a location accessible by the client, such as a server or other accessible storage system. The photographer then returns to the job (445), dealing with the client and photography process, leaving the process of processing the photographs to the server. In Block 460, the photographs are sorted according to jobs, identified by the coded components. The post processing operation is preferably handled by machine, without operator or photographer intervention. The post processing process links the coded components to the photographs before sorting the photographs according to the coded component. The photographs can be assigned a job name with a password to further enhance the security and privacy of the photographs. In Block 470, the client or the photographer can access the photographs, for example, to review, to sort, to request special consideration, or to order the photographs. This description is specifically related to digital photography with a memory card, but can be applied to other forms of photography such as films with appropriate modifications as common in the art.

In an embodiment, the coded component is linked or contains a link to a database, which can provide additional information. For example, a coded component can contain an ID number with a link to a database having information such client name, address, method of payment, and credit card information. For example, a school database can be established, with student IDs associated with the student's name and other related information. Thus a coded component can contain a link to the school database, enabling the coded component to be used in association with any photo activities for the school. A coded component can contain a link to the school, together with a particular student ID, which then enables the coded component to be used for that particular student. Additional information related to the photographs can be retrieved from the database.

Figure 4B:
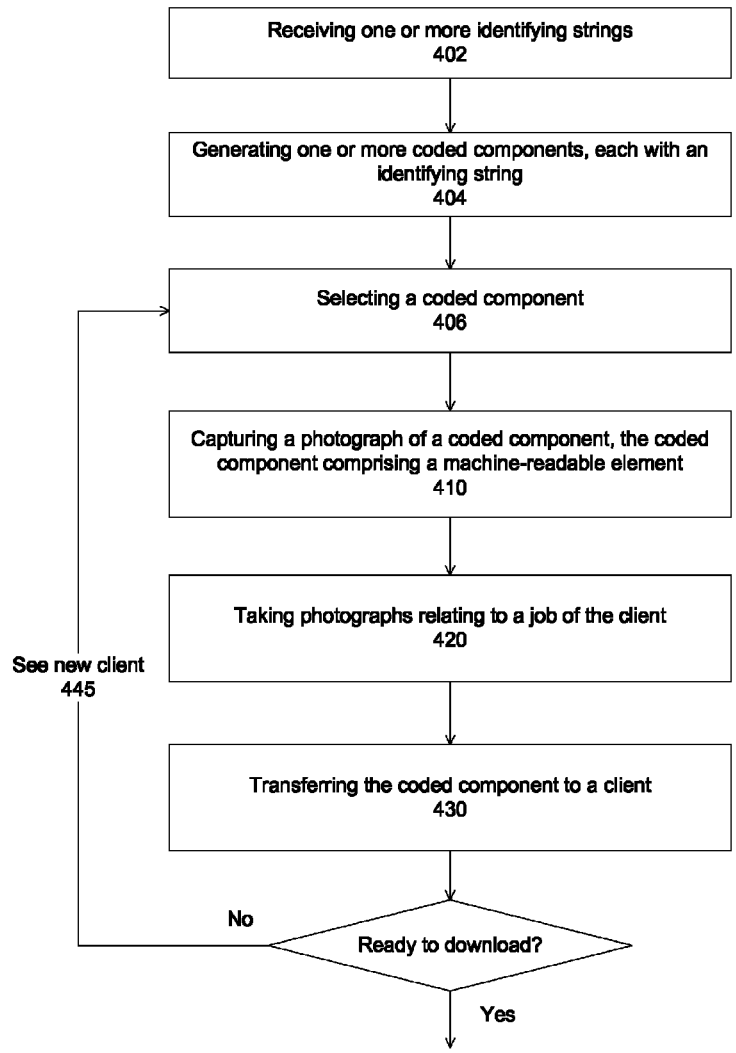

In an embodiment, the coded components are prepared ahead of time with unique identification strings. FIG. 4B illustrates an exemplary process of preparing coded components. Block 402 receives one or more identification strings by a photographer. For example, a computer algorithm can generate the required identification strings without any duplication. For multiple photographers, a server can coordinate between the photographers by a single computer algorithm, thus each photographer can be provided with a unique set of identification strings. Block 404 generates one or more coded components, each with an identification string. For example, after receiving a unique identification string, the photographer can input this identification string to a program, printing a business embedded with this identification string. Alternatively, blocks 402 and 404 can be combined, for example, by a photographer who prints a business card with a program employing an algorithm to generate unique identification string for each card. Also, the photographer could simply receive one or more cards with embedded identification strings, for example, from an employer or from a department handling coded component cards. The photographer may also receive an electronic version of the coded component for display on alternate media, such as a PDA, mobile phone, computer or other devices. In block 406, the photographer selects a coded component, and proceeds with the jobs, for example, with the sequence of blocks 410 forward, as described above.

Figure 5A:
FIGS. 5A-5C illustrate various exemplary coded component card examples.
Figure 5B:
Figure 5C:
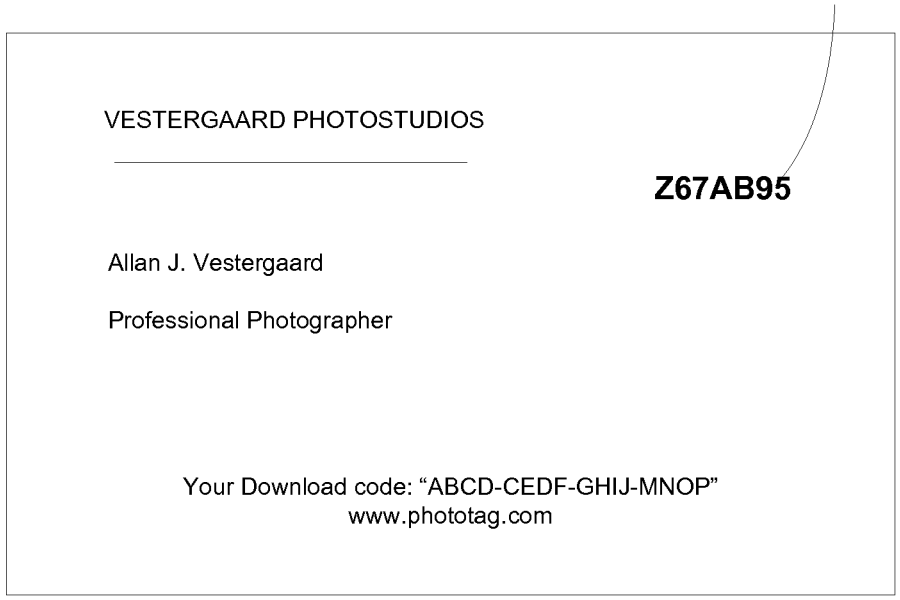

In an embodiment, the coded component comprises a unique graphic image that is machine readable and recognizable. The machine image can allow the machine to recognize the delimiter and thus can act as an identifier for a client, a subject or for other labeling or sorting purposes to group the pictures accordingly. The graphic image can be a one or two dimensional image such as a bar code or a bitmap pixel code (e.g., data matrix barcode). The graphic image may be a string of numbers or characters. The graphic image may also be a color code or arrangement of colors. This unique coded component may be printed (or imaged) onto a code card or on other substrates such as paper, plastic, proof sheets, or may be displayed on electronic screen such as a PDA, mobile phone, camera, or computer. In the case of the printed version, this coded component may exist as part of a unique business card used for marking the photographic job. The unique business card can then be used for the association and retrieval of images. FIGS. 5A-5C show examples of the coded component included on a card, showing the coded components 510A, 510B and 510C, respectively. This coded card or image display thus allows the photographer to delineate a stream of photographs and may serve other purposes to aid the photographer in tracking photographs or images.

The coded components are preferably machine generated and not repeated to avoid mixing the jobs. The code can be generated sequentially or randomly, and can be pre-prepared on the cards that the photographer carries or may be stored in electronic format to be displayed on other media such as a screen. The coded component may also be encrypted, such as with a signature, so that the origin of the generation of a coded component may be verified. Prior to a session, a user may generate a printed version of the coded component or a visual display on other media such as a PDA, for capture by the camera during a photography session.

The coded component may comprise other information in standard characters which are human readable. This coded card also allows the client to have access to both the code and any other instructions associated with the use of the card or the identification of photographs. In an aspect, the coded component card may include other instructions used for the retrieval of images. This may include a password link to the coded component, the name of the photography company, an image of the photography company logo, the name and contact information of the photographer and instructions for accessing and downloading images from the storage system.

In an aspect, the photographer may generate and carry a plurality of identical coded components, preferably separated by color coding to prevent mixing. For example, a first job is for a number of yellow coded cards containing the first coded component and a second job is for a number of blue coded cards containing a second coded component. One of the duplicated cards can be provided to the client, and other duplicated cards can be used for end tag, or for beginning tag for a new memory card.

An embodiment of the present invention allows the coded card to be defined. The coded card may include a graphical one or two dimensional code as well as other information in standard characters which are human readable. This coded card allows the client to have access to both the code and any other instructions associated with the use of the card or the identification of photographs. This coded card also allows the photographer to delineate a stream of photographs and may serve other purposes to aid the photographer in tracking photographs or images. The coded card can provide an optional field for special instructions.

In an aspect, the code portion of the card may include machine readable image such as 1D barcode (line code), 2D barcode (dot matrix code or data matrix barcode), standard alpha numeric characters to be read by an optical character reader (OCR), or any graphical image that can be processed by a machine. The card may include human readable image standard alpha numeric characters, or any graphical image that can be read by people. In an aspect, the coded card may be downloaded from a website and printed on a printer. Multiple coded cards may be generated. The information contained on the code card may further include the identification of the photographer or company taking the photographs, instructions for viewing, downloading, sorting or ordering the photographs after the event, and identifying names. The code card may also include the password link to the photographs.

In the case of a single photographer working for himself, the photographer may select the coded component from a software system that will generate coded components. The photographer may develop an association in his software system to the client or a list of clients, but this is not a system requirement. The coded component may then be printed onto a coded component card along with other relevant information such as the name of the company or photographer, the address, a password link for access to the photographs, or other information. The coded component may be printed on a card, or on another medium or stored electronically. Multiple duplicate cards may be generated, preferably color coded to prevent mixing. Also multiple unique coded component cards may be generated by the photographer at one sitting to facilitate multiple client shoots in a given time period.

In the case of multiple photographers working for a company, a master generator can generate multiple duplicated coded components to distribute to each photographer. The duplicated coded components can have some common features to be easily identified. For example, the duplicated coded components can be color coded, and thus the system can tell the multiple photographers to work on a red job, meaning the job having the coded component on a red card. Each photographer may have multiple duplicated cards, for example, to provide to a client and to mark the job for a new memory card. The color designation for a job may also occur electronically in cases where the coded component is displayed on other media such as a PDA, mobile phone, computer or other device.

Alternatively, each photographer takes a different coded component, and then reports the employed coded component to the company, who then links all the coded components to the same job. Many coded component cards or images on an alternate media (such as a PDA) exist for the same job, with different coded components and a way to link these coded components together. Duplicated coded components may also be used.

Alternatively, one user may develop the association between a coded component and the client's identifying information. This association is not required by the system, the information on the printed coded component card may be automatically downloaded and linked to the coded component. This information may be stored in a database for access later by other photographers. One individual may generate the printed versions of the coded components or each photographer may print one or multiple coded component cards for a photo shoot. Electronic versions may be transferred to external devices, such as a PDA.

Multiple coded component cards may exist for the same client job. These cards may have the same coded component but may have different identifying information. For example, in the case where a coded component card is generated that includes the photographer's name and contact information, different names may be listed to correspond to the different photographers while the coded component remains the same.

In the case of a single photographer working as a contractor for a company, the coded component card or other media containing the coded component may be generated by the company and prepared for physical pickup by the contractor. The coded component may also be transferred electronically to the photographer for printing at a different location such as the photographer's workplace or home office or for display electronically, without generating a hard copy.

In another aspect of the embodiment, multiple cameras may be used to generate photographs that are associated with the same coded component. This allows for a team of photographers, a photographer with multiple cameras or a combination thereof to generate a series of photographs for a client.

In an aspect, the coded component would be captured prior to the photo shoot by each camera in use for the session. Coded component image capture may be achieved by generating multiple copies of the same coded component and using each camera to photograph the media upon which the coded component has been placed. In an alternative method, one coded component card may be generated and each camera may capture an image of the same coded component card prior to the photo shoot. Alternatively, the coded component may be captured from another media such as a PDA.

Further, this feature would allow the incorporation of photos taken by other parties, such as guests at a wedding. In this case, the photographer would decide how the images are grouped. The images could be grouped serially, for example Camera A images are followed by the images from Camera B and so on. The images could also be intertwined by using the time and date stamp of the image file. The photographer may also manually determine the order and grouping of the images.

Other variations exist and are within the scope of the present invention.

Figure 6:
FIG. 6 illustrates an exemplary coded component card with an option field for client or photographer specifications or notes.

In an embodiment, the coded component can include an option field which is either machine readable or human readable or both. The option field can extend the use of the system beyond sorting and organizing the pictures to additional post processing steps. The option field can be added to the card, selected or added by the photographer or the client. For example, the option field can include special requests such as matte or gloss finish, picture retouch or not, color or black and white format, resolution required, storage requests, separate accounts, special billing requirements, etc. The option field can be machine readable so that the machine can automatically perform the option request. The optional field can be human readable to enable the client or the photographer to set the field value. In an aspect, the option field comprises a number corresponding to a selection check list where someone, such as the client or the photographer, selects the proper option. The option field can comprise a blank section for writing in the special request. FIG. 6 illustrates an exemplary business card comprising an option field for selection check mark. A coded component may also contain a link or be linked to an option enabling the photographer to capture coded components associated with order or post-processing instructions.

In an embodiment, the photographer or his designate will download the photographs to a storage system. The coded component is also downloaded to the storage system along with the series of photographs since the coded component exists in the form of a photograph, at the beginning and/or the end of the series. In an aspect, the sequence of download preserves the sequence of pictures taken, e.g., the pictures are downloaded based on time sequence, the first picture taken is downloaded first before the second picture captured. This is similar to analog film since the pictures are developed as a function of time. This can facilitate the grouping of photographs according to the coded component, since any pictures between two coded components belong to either coded component, depending on the set up. This preservation of time sequence can allow the use of memory cards without any coded component picture, since after downloading, all pictures are present, and not separated by the limitation of the memory cards. For example, memory cards 2 and 3 do not have any coded component pictures, but after downloading, these pictures are sandwiched between a coded component in memory card 1 and a coded component in memory card 4. From the storage point of view, there are no separation of memory cards, and thus these pictures all are sandwiched between two coded components (except maybe the last job).

In an aspect, the time sequence preservation can be recovered by other techniques such as incremental file name or time stamp. For example, the digital camera has a setting where the captured pictures are stored in a file on a memory medium, and the file has a unique name which can be the incremental sequence number that will identify the sequence. For example, the first file can be named img0567.jpg and the next file, representing the picture taken immediately after the first file, is named img0568.jpg. Thus by observing the file name, a time sequence can be re-constructed without following any downloading procedures. Alternatively, the camera can have a built in clock, and when a picture is taken, this clock (date and time) can be stored or embedded in the file as a time stamp. This time stamp can allow the re-construction of the time sequence of the taken pictures. The time stamp method can provide an additional advantage over the file sequence in the case of multiple cameras or photographers on the job. With multiple memory cards to be downloaded, the time stamp feature can successfully group the pictures according to the time of the event. Other information can be employed for indicating an end of a picture series, including a time out value, an error signal, a counter system, or a long break time between photographs.

The memory cards preferably contain coded components to identify the taken pictures. For example, it is preferable to start and finish a job within one memory card, or to start a new job with a new memory card. However, this is not always possible, so it is also preferable to keep a coded component (for example, a duplicated coded component if the first coded component is given to the client, or not giving the coded component to the client until after the job) so that a coded component can be included in the pictures of a new memory card. Also, the memory cards can be sequentially numbered, so that the picture order can be reconstructed from the sequence number of the memory cards. Alternatively, file sequence or time sequence might be employed to reconstruct the job sequence, and group the pictures accordingly.

In an embodiment, the automatic post processing comprises an auto sort process where the downloaded pictures are sorted into groups based on job number. The coded components are machine processed to recover the job number, and the pictures belonging to this job number are linked to the job. Depending on the procedure of capturing the coded components, the photographs can be sorted differently. For example, if the first picture of the job is the picture containing the coded component, then all the pictures between this coded component and the subsequent coded component belong to the job identified by this coded component. In an aspect, all pictures are processed to identify the coded components and the number of coded components. Then the pictures are sorted and categorized into groups. In an aspect, the pictures are processed in sequence, and each processed picture is determined to have a coded component, or belongs to a group identified by a coded component.

In an aspect, a job can have a plurality of coded components, and thus all pictures belonging to these coded components belong to the same job. Other post processing methods to group the photographs can be employed based on the order of coded components.

In an embodiment, the coded component link to the photograph or series of photographs may allow for privacy of the client by restricting online access to the photograph(s) to users with a code or password linked to the code. The photographer or other administrator may configure an account log in with a password for each client or for other photographers to access the images. The login information and password may then be distributed to the client (or may have been previously distributed if it is placed on the coded component card) for the purpose of accessing the photographs.

In an aspect, the user may sort, inspect, select, modify or distribute the photographs based on the coded component link. For example, the user may access the images online, inputting either the coded component or a password link to access the photographs. In this example, the user may be allowed to distribute this coded component or password link to other individuals (such as family members or friends) for access to the images for review. This feature may enable an additional option of categorizing some images as private. In this case, the master user may access the images, review them and sort some images into a designated group. Subsequent access may be allowed with a different password link allowing other users to access only limited groups of images.

Figure 7:
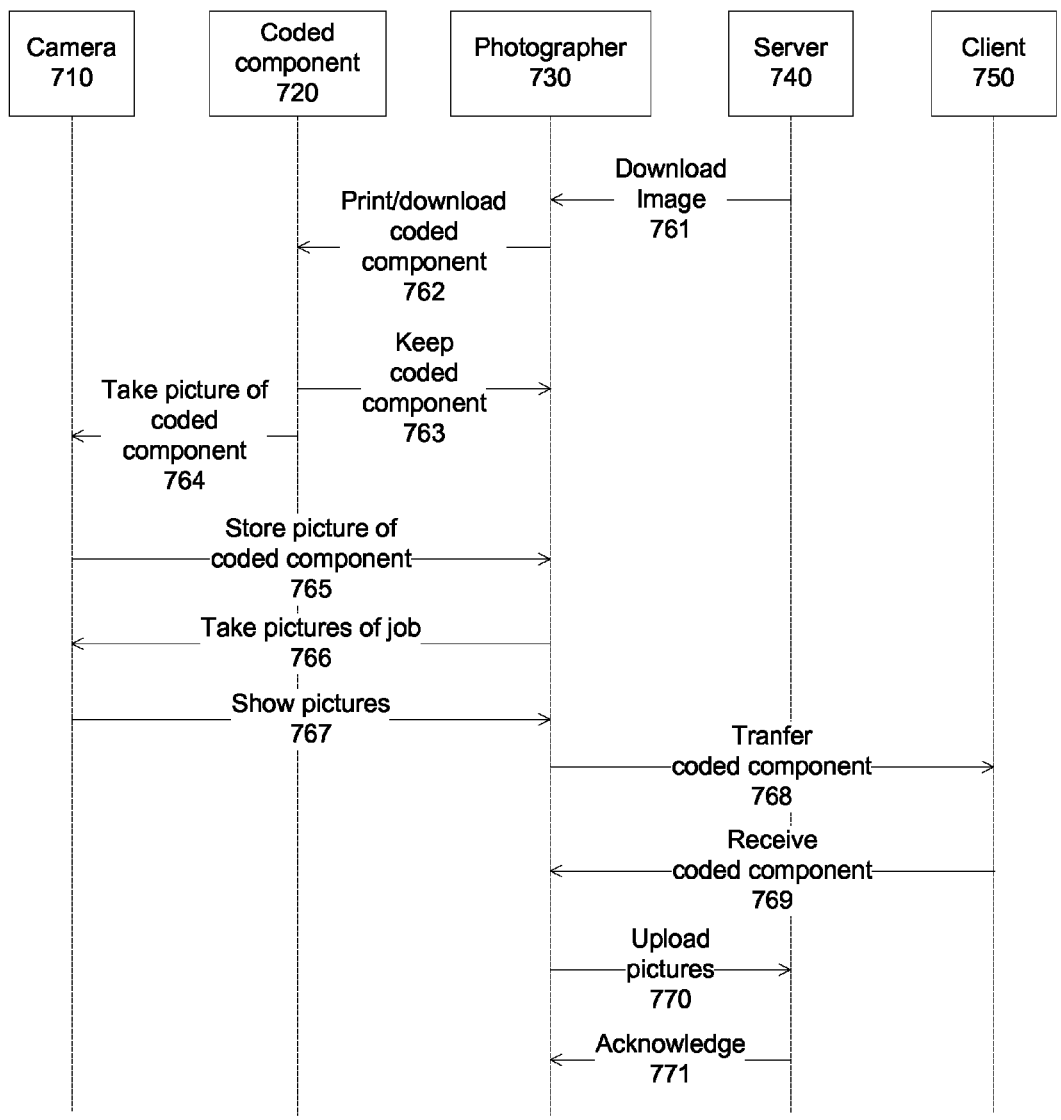
FIG. 7 illustrates an exemplary overview of a process according to an embodiment of the present invention.

FIG. 7 outlines an overview of the process described in this invention where a photographer or photographers may capture an image of a coded component to mark a photo shoot or job and may then pass this coded component on to a client for future access to photographs. The photographer 730 downloads (761) a unique identification string, preferably in the form of an image, from a server 740. The photographer then prints or downloads (762) and keeps (763) the coded component 720, for example, in the form of a business card. The photographer then proceeds to a client 750, taking a picture of a coded component (764) with a camera 710. The coded component 720 is then stored (765) in a photograph within a series of photographs of the job. The photographer performs (766) a photo shoot and stores (767) a series of photographs. The coded component is then transferred (768) to the client 750, who receives (769) the coded component as a means to access the photograph, and other services. The photographs are uploaded (770) to the server 740, with an acknowledge receipt (771). The client may later access these photographs, using a link to the coded component or other access methods implemented by the photographer.

Figure 8:
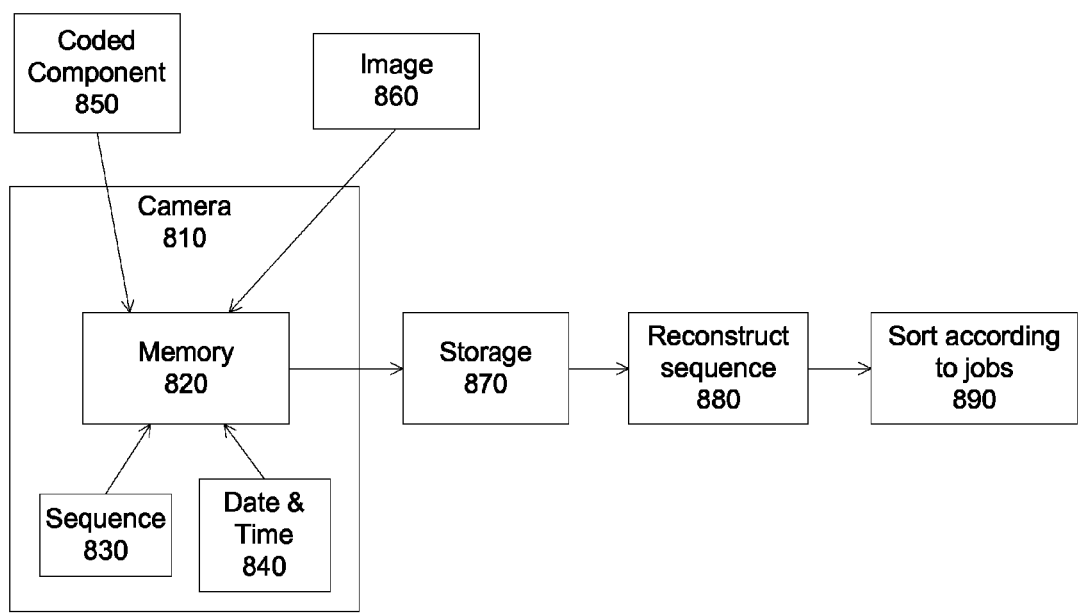
FIG. 8 illustrates another exemplary overview of a process according to an embodiment of the present invention.

FIG. 8 demonstrates the incorporation of the coded component into a sequence of photographs with time and date stamps. The coded component 850 and an image or series of images 860 are captured by a camera 810 (or cameras) and stored in the camera's memory 820. The camera automatically creates a sequence 830 of file names for the photographs, together with the time and date stamp 840. The coded component and the sequence of images are downloaded to a storage medium 870. At the server, the sequence of images is reconstructed 880 (in the case of multiple cameras for example). The set of images are sorted to jobs 890 and made available for client access.

An additional aspect of the embodiment allows for multiple coded components to be associated with an image. This would allow association of images to different events where applicable. For example, this would allow image association for Individual A, present at the rehearsal dinner and Individual A, present at the wedding. In an aspect of the invention, the user may manually associate images with the coded component. This would allow for association of images in the case where the automatic upload did not occur or where images were added from another source. For example, the client may incorporate photographs of his own into a set of the photographer's captured images for the purpose of archiving or providing access to other family members. Software may be configured to allow the client or the photographer or other user or administrator to associate these incorporated photographs with the event.

In an aspect, the coded component association may be linked with any image captured by photography (i.e. not limited to photograph of scenery or subjects) including but not limited to: photographs of documents, medical records, or art work. In this aspect, the coded component may be used to later access a series of images for review by individuals with the coded component or a password link to the coded component. This feature will enable unique tracking and sorting of documents or other objects captured by the camera. An example of this feature is submissions for an art competition. A coded component may be established between a competition event and a set of individual submissions, allowing other users to access a set of photographs for the purpose of reviewing or judging the submissions. This feature could also enable grouping of photographs captured at an estate sale, for example.

In an embodiment, the present invention discloses a process and an apparatus by which a coded component may be embedded to each photograph. In this case, the coded component is prepared and included in the field of view of the camera so that it is part of the final image. The photographs may then be transferred to a storage server and automatic sorting may occur based on this coded component tag. One aspect of this embodiment provides for the identification of an individual person or subject from a group of photographs.

Figure 9A:
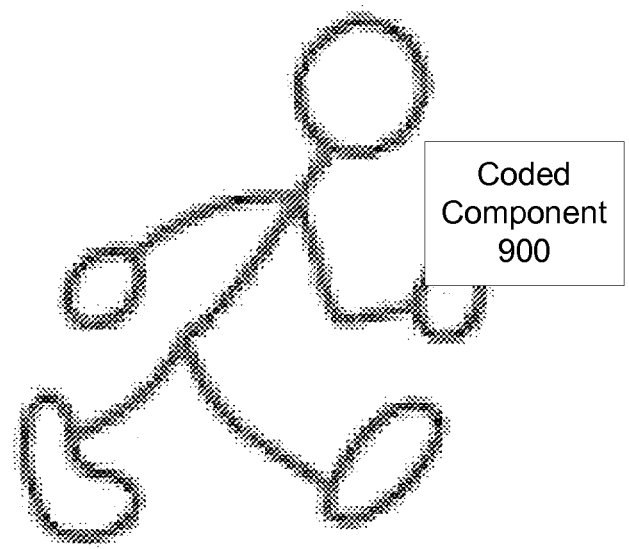
FIGS. 9A-9B illustrate various exemplary embodiments of photographs with embedded coded component.

In an aspect, a subject may hold the coded component while the photograph is being captured by the photographer as illustrated by FIG. 9A. This allows identification of individual photographs or groups of photographs such as may be taken at a posed photo shoot. Examples of posed photo shoots include school portraits, family photo sessions, engagement photographs or other cases where photographs are captured by a photographer. In the case of a posed photo shoot, the individual or individuals being photographed may hold the coded component for a first test shot. All subsequent photographs would then be grouped with this coded component.

Figure 9B:
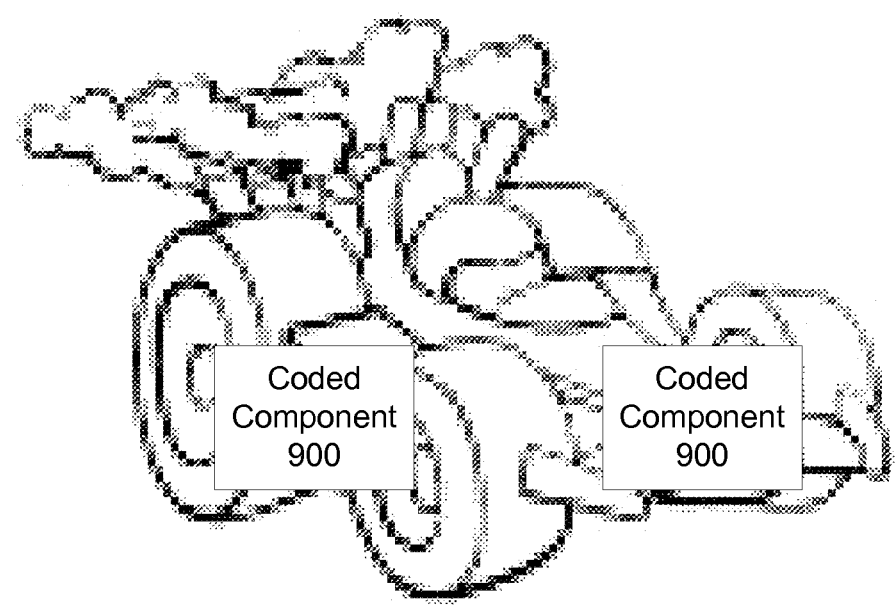

The coded component could also be worn by a subject, such as on a nametag or identification badge. This implementation would allow for photograph grouping and identification at sporting, corporate, family or other events. In some cases, an individual image may contain more than one coded component, such as when multiple team members are photographed at a sporting event. In this case, the photographs may be sorted for individuals or groups of individuals (e.g., AND or OR sorting). This aspect may also apply to inanimate subjects, illustrated in FIG. 9B, such as exhibits at a science fair, art works in an auction or animals at a competition. This feature would be especially useful for sorting photographs taken at an automobile race, for example. In this case, the coded component may be included on several small, visible areas of the outside of the automobile.

In another aspect, the coded component may be placed within the field of view for later identification, sorting and retrieval of photographs. For example, at an artwork competition, the coded component may be placed next to the artwork for incorporation within the field of view of the camera. Further, it may allow the user to sort, inspect, select, modify or distribute the photographs based on the coded component link. For example, the user may access the images online, inputting either the coded component or a password link to access the photographs. In this example, the user may be allowed to distribute this coded component or password link to other individuals (such as family members or friends) for access to the images for review.

Figure 10:
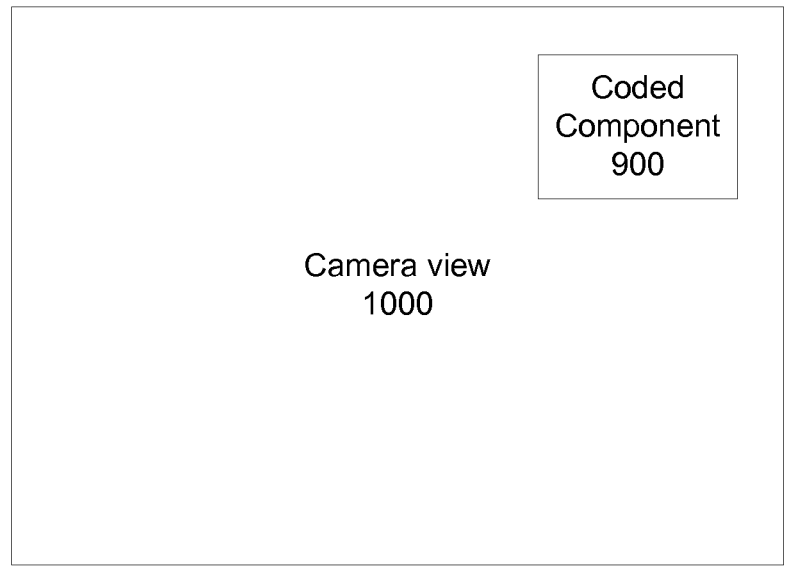
FIG. 10 illustrates an exemplary embodiment of a process to embedded coded component to photograph by which the coded component is attached directly to the camera's field of view.

In an embodiment, the present invention discloses a method and an apparatus for the attachment of a coded component directly to the camera or camera lens so that whenever a photograph is captured, the code will be embedded into the image for later processing. This may be accomplished with an optical or mechanical device. In an aspect, the coded component is prepared and attached to the camera's field of view, as illustrated in FIG. 10, so that each photograph captured includes the coded component.

Figure 11:
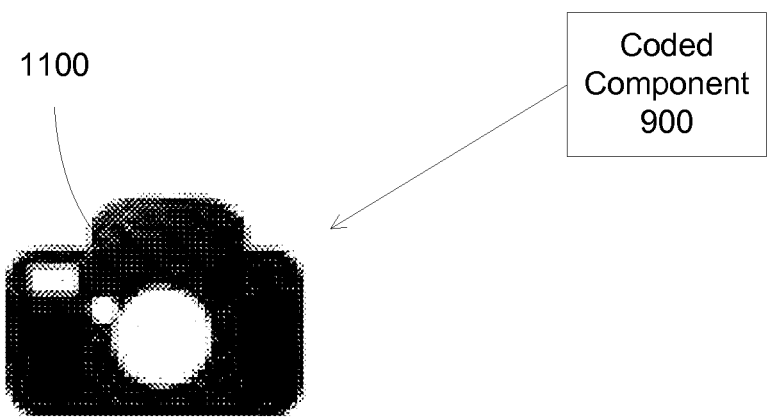
FIG. 11 illustrates an exemplary embodiment of a process to embedded coded component to photograph by which the coded component may be associated with the memory file of the camera.

In an embodiment, the coded component may be linked directly to the memory file on the camera, as illustrated by FIG. 11. This embodiment comprises of coded component preparation and incorporation into the memory file of the camera so that each photograph taken will have the coded component embedded into the memory file. When required, the photographer shall have the ability to change the coded component association to correspond with a different client or photography job. This feature also enables the use and re-use (mix and match) of a coded component during a short period of time. This would prove useful to a photographer capturing multiple clients at a single event such as graduates and their families at a graduation or contestants at an event. In an aspect, the camera will allow for selection of coded components by the photographer.

In an embodiment, the user may later assign a coded component to the memory file of the image, using the date and time stamp as a link to the coded component. In this aspect, the user may specify that photographs taken between listed times and/or dates are to be associated with a specified coded component. The user may assign a coded component to the memory file of the image manually. This operation may be performed on a single photograph or multiple photographs. This feature allows for the establishment of the coded component link independent of any printed version of the coded component.

In an embodiment, the present invention discloses a process of linking the appointment data to the date and time of the captured photographs, for example, to identify the client to the photographs taken by the camera, or by associating different client identifications with different photographs. In an aspect, the photographer, or his business associates, maintains an appointment calendar, or any similar component, which records the identification of a job (such as the identification of the client or the event), and the date and/or time of the job. The calendar is preferably maintained in an electronic format, to allow process automation. The photographer then goes to the client and starts taking photographs using a camera that provides date and/or time stamp. The appointment calendar and the taken photographs are then loaded to a server (or alternatively, the photographs can be loaded to the server hosting the calendar application), and an algorithm associates the photographs to the jobs, using the date and/or time extracted from the photographs and the calendar as linkage. For example, any photograph having time stamp in the vicinity of the date and/or time of the job appointment is automatically assigned to the job. First, the time stamp of a photograph is retrieved to extract the date and/or time of the photograph. If the date and/or time are within the time window of a job appointment, the photograph is then assigned to the job. Other conflict resolved algorithms can include the sequence of the photographs, or the small time difference between photographs. For example, if two photographs are within a few seconds (or minutes) of each other, it is likely that they belong to the same job. Alternatively, a long break between photographs, for example, a day or two, can indicate that the two photographs belong to different jobs.

In the event of ambiguity, conflict resolution algorithms can be employed. For example, if a camera is not properly set up for date and time, a number of photographs might have a time offset. Software algorithm can be use to calculate the time offset, and reset the time stamp for these photographs. Alternatively, human intervention can be used. In an aspect, the time window for a job appointment can be determined from the starting times and/or the ending times of the jobs. The time window can be between the starting time and the ending time, or can be between some predetermined time before the starting time and some other predetermined time after the ending time. For example, the time window can start about half an hour before the starting time of the job, and end at about 1 to 2 hours after the scheduled time. Alternatively, the time window can be calculated from the previous and/or the next job appointments. For example, a start time of a time window for a job can be a fraction of the time the previous job ends and the current job starts. Similarly, an end time of a time window for a job can be a fraction of the time the current job ends and the next job starts.

Multiple cameras may be used to generate photographs that are associated with the same date and/or time linkage between the photographs and the calendar appointment date. This allows for a team of photographers or a single photographer to generate a series of photographs for a client.

In an aspect, the appointment calendar contains information that allows the clients to access the photographs. For example, a client identification and/or a password can be given to the clients so that the clients can access the photographs. The identification and password link to the photograph or series of photographs may allow for privacy of the client by restricting online access to the photograph(s) to users with a code or password linked to the clients. Further, it may allow the user to sort, inspect, select, modify or distribute the photographs based on the identification.

The present invention may also be embodied in a machine or computer readable format, e.g., an appropriately programmed computer, a software program written in any of a variety of programming languages. The software program would be written to carry out various functional operations of the present invention. Moreover, a machine or computer readable format of the present invention may be embodied in a variety of program storage devices, such as a diskette, a hard disk, a CD, a DVD, a nonvolatile electronic memory, or the like. The software program may be run on a variety of devices, e.g. a processor.

Figure 12A:
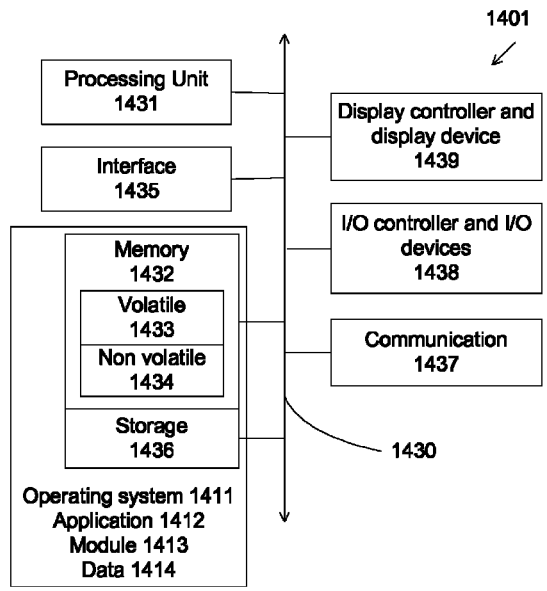
FIGS. 12A-12B illustrate an exemplary data processing system and environment to practice the present invention.
Figure 12B:
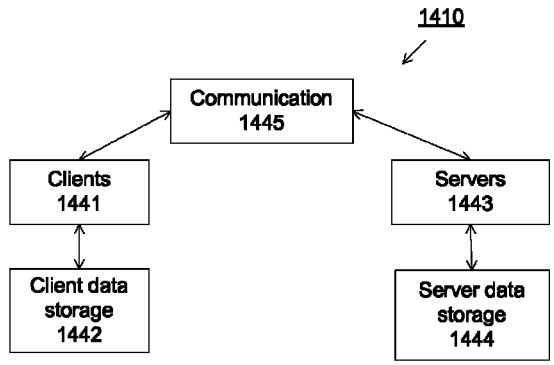

With reference to FIGS. 12A and 12B, an exemplary environment for implementing various aspects of the invention includes a computer 1401, comprising a processing unit 1431, a system memory 1432, and a system bus 1430. The processing unit 1431 can be any of various available processors, such as single microprocessor, dual microprocessors or other multiprocessor architectures. The system bus 1430 can be any type of bus structures or architectures, such as 12-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), or Small Computer Systems Interface (SCST).

The system memory 1432 can include volatile memory 1433 and nonvolatile memory 1434. Nonvolatile memory 1434 can include read only memory (ROM), programmable ROM (PROM), electrically programmable ROM (EPROM), electrically erasable ROM (EEPROM), or flash memory. Volatile memory 1433, can include random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), or direct Rambus RAM (DRRAM).

Computer 1401 also includes storage media 1436, such as removable/nonremovable, volatile/nonvolatile disk storage, magnetic disk drive, floppy disk drive, tape drive, Jaz drive, Zip drive, LS-100 drive, flash memory card, memory stick, optical disk drive such as a compact disk ROM device (CD-ROM), CD recordable drive (CD-R Drive), CD rewritable drive (CD-RW Drive) or a digital versatile disk ROM drive (DVD-ROM). A removable or non-removable interface 1435 can be used to facilitate connection.

The computer system 1401 further can include software to operate in environment 1400, such as an operating system 1411, system applications 1412, program modules 1413 and program data 1414, which are stored either in system memory 1432 or on disk storage 1436. System applications can include various algorithms to transfer photograph files, identify photograph containing coded component, recognize coded component, and sort the photographs to different jobs. Additional algorithms such as client billing and secured payment can also be included. Various operating systems or combinations of operating systems can be used.

Input devices 1422 can be used to enter commands or data, and can include a pointing device such as a mouse, trackball, stylus, touch pad, keyboard, microphone, joystick, game pad, satellite dish, scanner, TV tuner card, sound card, digital camera, digital video camera, web camera, and the like, connected through interface ports 1438. Interface ports 1438 can include a serial port, a parallel port, a game port, a universal serial bus (USB), and a 1394 bus. The interface ports 1438 can also accommodate output devices 1421. For example, a USB port may be used to provide input to computer 1401 and to output information from computer 1401 to an output device 1421. Output adapter 1439, such as video or sound cards, is provided to connect to some output devices such as monitors, speakers, and printers.

Computer 1401 can operate in a networked environment with remote computers 1424. The remote computers 1424, shown with a memory storage device 1425, can be a personal computer, a server, a router, a network PC, a workstation, a microprocessor based appliance, a peer device or other common network node and the like, and typically includes many or all of the elements described relative to computer 1401. Remote computers can be connected to computer 1401 through a network interface 1423 and communication connection 1437, with wire or wireless connections. Network interface 1423 can be communication networks such as local-area networks (LAN), wide area networks (WAN) or wireless connection networks. LAN technologies include Fiber Distributed Data Interface (FDDI), Copper Distributed Data Interface (CDDI), Ethernet/IEEE 1202.3, Token Ring/IEEE 1202.5 and the like. WAN technologies include, but are not limited to, point-to-point links, circuit switching networks like Integrated Services Digital Networks (ISDN) and variations thereon, packet switching networks, and Digital Subscriber Lines (DSL).

FIG. 12B is a schematic block diagram of a sample computing environment 1410 with which the present invention can interact. The system 1410 includes a plurality of client systems 1441. The system 1410 also includes a plurality of servers 1443. The servers 1443 can be used to employ the present invention. The system 1410 includes a communication network 1445 to facilitate communications between the clients 1441 and the servers 1443. Client data storage 1442, connected to client system 1441, can store information locally. Similarly, the server 1443 can include server data storage 1444.

Figure 13:
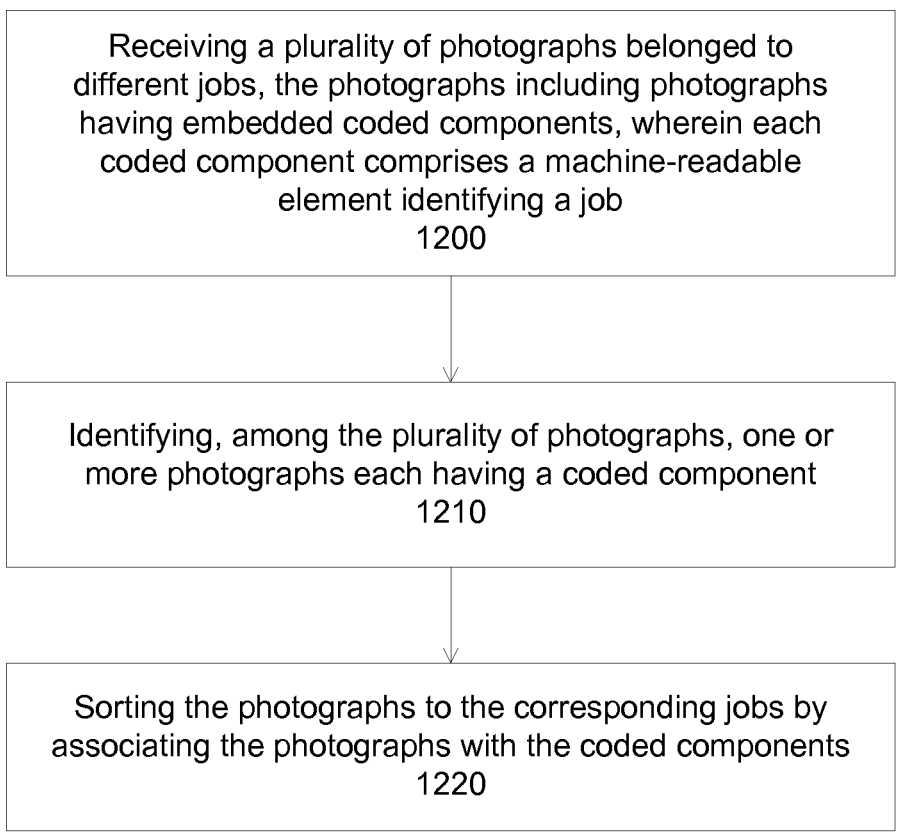
FIG. 13 illustrates an exemplary process of automating a photography business according to an embodiment of the present invention.

FIG. 13 illustrates an exemplary method for a data processing system to perform an embodiment of the present invention. In block 1200, a data processing system, such as a server, receives a plurality of photographs belonged to different jobs. The photographs also included photographs having embedded coded components, which can serve as delimiters for the jobs by comprising a machine-readable element identifying a job. These photographs can be transferred from one or more photographers regarding the photographs taken for one or more jobs. In block 1210, the server identifies one or more photographs each having a coded component. The coded components then can be decoded, and in block 1220, the photographs are sorted to the corresponding jobs by associating the photographs with the coded components.

Figure 14:
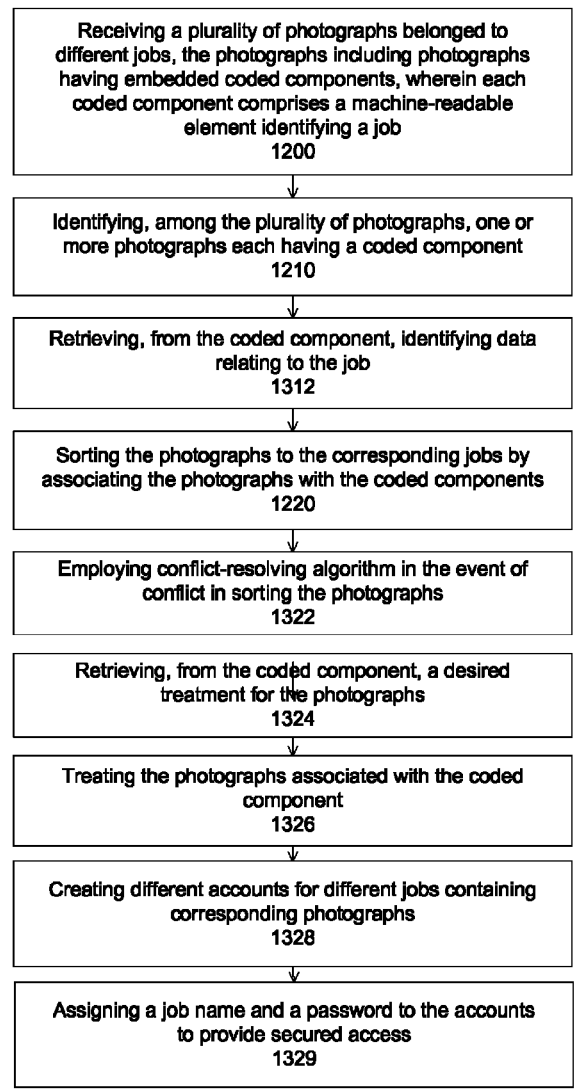
FIG. 14 illustrates another exemplary process of automating a photography business according to an embodiment of the present invention.

FIG. 14 illustrates another exemplary method for a data processing system to perform an embodiment of the present invention. In blocks 1200 and 1210, the photographs are received by a server with the photographs containing the coded components identified. In block 1312, the server, e.g., a program running on the server employing a pre-coded algorithm, retrieves, from the coded component, identifying data relating to a job. For example, the data can include the job name and password, which can be used later for generating an account for the client. The data can indicate how the photographs are sequenced, for example, beginning coded component with job photographs immediately after the photograph containing the coded component, an end coded component with job photographs immediately before the photograph containing the coded component, or beginning and end coded components sandwiching job photographs. The data can also indicate that the photographs are sequenced with file names or with date and time, to determine the order of the photograph sequence. In block 1220, the photographs of different jobs are sorted to the corresponding jobs, by associating the photographs with the coded components. For example, if the retrieved coded component identifies that it is a beginning coded component with no end coded component, the photographs after the coded component photograph in the photograph sequence are associated with the coded component, until encountering another beginning coded component photograph. The coded component can also identify time sequence, for example, any unusual large time gap between the photographs can also serve as the delimiter, separating the photographs between jobs.

In block 1322, the server can employ a conflict-resolving algorithm in the event of conflict in sorting the photographs. For example, if there is a large time gap between photographs, a predetermined algorithm can be set to address the issue. Alternatively, an operator intervention can be requested to solve the conflict.

In block 1324, the server can retrieve from the coded component, an optional desired treatment for the photographs or for the client. In block 1326, the server performs the treatment according to the decoded information from the coded components. For example, the coded component requests a gloss finish on the photographs, and the server can perform the requested treatment on the photographs associated with the coded component having the request. Alternatively, the coded component can request a special billing requirement, and the server can set up the account for the client to satisfy the special request.

In block 1328, the server creates different accounts for different jobs containing the corresponding photographs. In block 1329, a job name and optionally a password can be assigned to the accounts to provide secure access to different clients. With the automatic sorting and account set up, only the proper clients can access their photographs, thus offering a secure environment of photograph distribution, for example, in the Internet environment.

Figure 15:
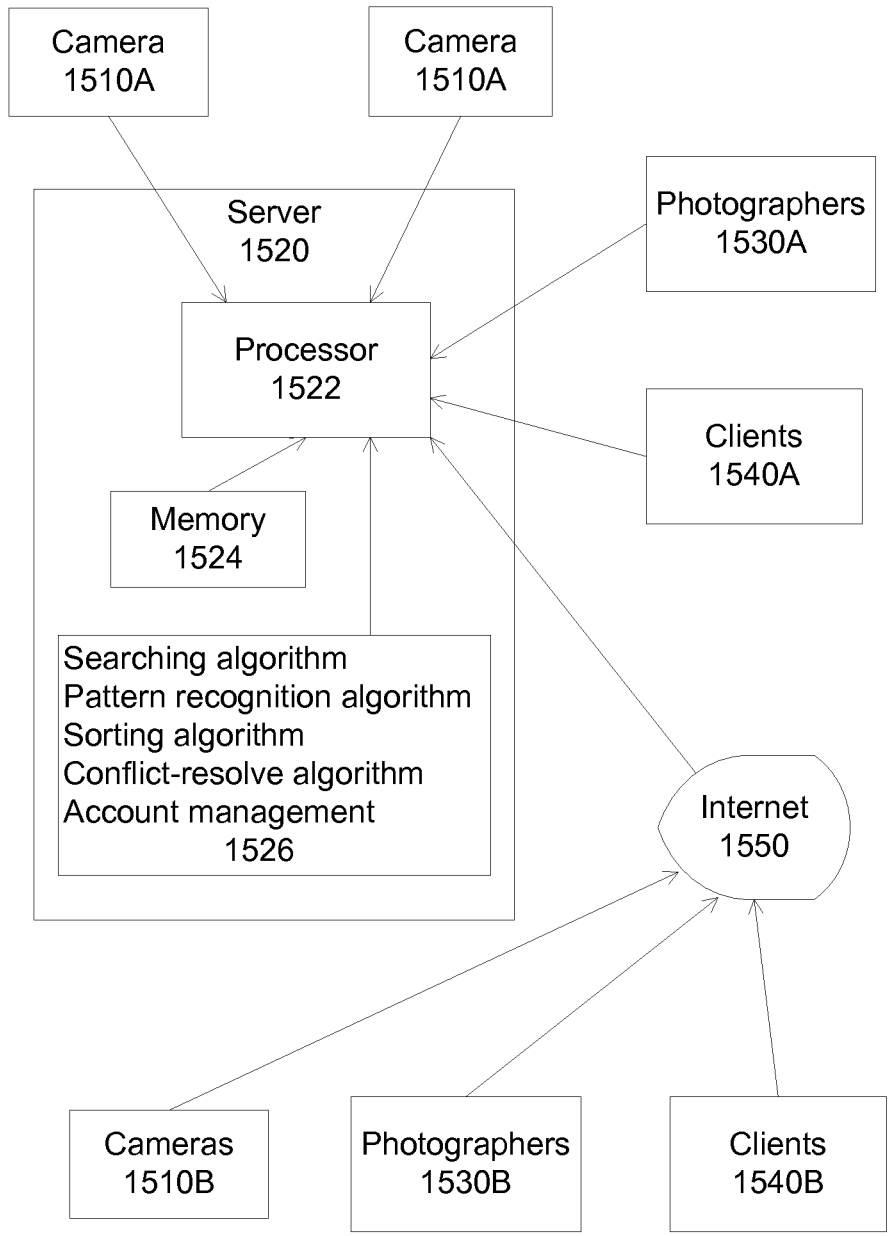
FIG. 15 illustrates an exemplary overview of the present automating a photography business according to an embodiment of the present invention.

FIG. 15 illustrates an exemplary data processing system according to an embodiment of the present invention. The system comprises a server 1520, such as a computer or any data processing system, which includes a processor 1522 linking to a memory 1524 and software programs 1526, such as searching algorithm for searching photographs containing coded components, pattern recognition algorithm for decoding the coded components, sorting algorithm to sort photographs to corresponding jobs, conflict resolving algorithm to solve conflict in sorting, account management programs, and other needed computer management programs. One or more local cameras 1510A, photographers 1530A and clients 1540A, and one or more remote cameras 1510B, photographers 1530B and clients 1540B can connect to the data processing system 1520, directly or through network connection such as the Internet 1550. The cameras can be connected to the server, for example, through the photographers or through an associate, for downloading photographs, including photographs containing the coded components. The photographers can connect to the server to get the unique coded component or to print cards having embedded coded component. The photographers can also connect to the server for accessing the photographs, for example, to provide feedback to the client regarding a treatment of the photographs. The clients can connect to the server to access the photographs, ask questions, receive invoices and perform payments. The server can run unattended, and require minimum operator intervention, since the process is designed to achieve full automation for the photograph business.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims. For example, a "camera" is not limited to a single purpose camera only but may include a camera phone, a video camera or other device used for image capture. Further, a "picture" or "photograph" may include a still or moving image. Reference to a memory card shall include any method used for storage of electronic files.

What is claimed is:

1. A method to improve automation of a photography process, comprising:
    taking at least a first photograph of a coded component using a handheldable camera, the coded component comprising a machine-readable element; and
    taking one or more second photographs relating to a job of a client using the handheldable camera,
    wherein the one or more second photographs do not contain the coded component,
    wherein the at least a first photograph is operable to mark at least one of a beginning and an end of the one or more second photographs;
    sending the taken photographs, including the at least a first photograph and the one or more second photographs, to a data processing system, wherein the data processing system is configured to process the taken photographs to identify the at least a first photograph, and associating the one or more second photographs with the machine-readable element of the at least a first photograph.

2. A method as in claim 1 further comprising
    providing at least one of the coded component and information relating to the coded component to the client.

3. A method as in claim 2 wherein either taking the one or more photographs relating to the job is performed before or after taking the photograph of the coded component, or
    taking the photograph of the coded component is performed before or after providing the coded component to the client.

4. A method as in claim 1 wherein taking a photograph of the coded component comprises taking a picture of the client with the coded component.

5. A method as in claim 1 wherein the coded component further comprises human-readable information which comprises at least one of public information and secured information to enable the client to access the one or more photographs.

6. A method as in claim 1 wherein the coded component further comprises an option field which indicates a desired treatment for the job.

7. A method as in claim 1 wherein the machine-readable element comprises at least one of a 1-D barcode, a 2-D code, a color code, machine recognizable characters, and patterns that are recognizable by a machine vision program.

8. A method as in claim 1 wherein the machine-readable element links to a client database to provide information related to the client.

9. A method to improve automation of a photography process, comprising:
    receiving a plurality of photographs belonging to different jobs, the plurality of photographs including first photographs having embedded coded components and second photographs not having embedded coded components,
    wherein one or more first photographs are operable to mark at least one of a beginning and an end of one or more second photographs that belong to a job of the different jobs,
    wherein each coded component comprises a machine-readable element configured for identifying a job, and
    wherein the plurality of photographs are taken using a same handheldable camera;
    processing the plurality of photographs to identify the one or more first photographs; and
    sorting the plurality of photographs to the corresponding jobs by associating the one or more second photographs with the coded components of the one or more first photographs.

10. A method as in claim 9 further comprising retrieving, from the code component, identifying data relating to the job.

11. A method as in claim 9 wherein a coded component further comprises a desired treatment for the job, the method further comprising: performing the treatment.

12. A method as in claim 9 wherein the photographs of the plurality of photographs receding or following the photograph containing the coded component are associated with the coded component.

13. A method as in claim 9 wherein the plurality of photographs comprise at least one of a sequence number and a time stamp and the plurality of photographs with the sequence number or time in the vicinity of that of the coded component photograph are associated with the coded component.

14. A method as in claim 9 further comprising assigning at least one of a job name and a password to the plurality of photographs of a job to restrict access to the plurality of photographs.

15. A method as in claim 9 further comprising employing a conflict-resolving algorithm in the event of conflict in sorting the plurality of photographs.

16. A machine readable medium comprising instructions to execute the method of claim 9.

17. A data processing system to improve automation of a photography process, comprising:
    means for receiving a plurality of photographs belongs to different jobs, the plurality of photographs including first photographs having an embedded coded component and second photographs not having embedded coded components,
    wherein one or more first photographs are operable to mark at least one of a beginning and an end of one or more second photographs that belong to a job of the different jobs,
    wherein each coded component comprises a machine-readable element configured to identify a job, and
    wherein the plurality of photographs are taken using a same handheldable camera;
    means for processing the plurality of photographs to identify the one or more first photographs;
    means for sorting the plurality of photographs to the corresponding jobs by associating the one or more second photographs with the co components of the one or more first photographs.

18. A data processing system as in claim 17 wherein a coded component further comprises a desired treatment for the plurality of photographs, the data processing system further comprising:
   means for treating the plurality of photographs associated with the coded component.

19. A data processing system as in claim 17 further comprising means for employing a conflict-resolving algorithm in the event of conflict in sorting the plurality of photographs.

20. A method as in claim 2 wherein taking the one or more photographs relating to the job is performed after taking the photograph of the coded component.

* * * * *